United States Patent [19]

Gratzmuller

[11] 3,954,249
[45] May 4, 1976

[54] DRAIN DEVICES IN HYDRAULIC CONTROL CIRCUITS

[76] Inventor: Jean Louis Gratzmuller, 66 boulevard Maurice Barres, Neuilly-sur-Seine, France

[22] Filed: Mar. 21, 1975

[21] Appl. No.: 560,779

[30] Foreign Application Priority Data
Mar. 26, 1974 France .............................. 74.10294

[52] U.S. Cl. .................................... 251/29; 91/461; 200/82 R
[51] Int. Cl.² ...................................... F16K 31/124
[58] Field of Search .................. 251/29, 28; 91/461, 91/454; 200/82 R

[56] References Cited
UNITED STATES PATENTS

| | | | |
|---|---|---|---|
| 1,767,037 | 6/1930 | Anderson | 251/29 X |
| 2,491,112 | 12/1949 | Jansson | 251/29 X |
| 2,676,779 | 4/1954 | Boden et al. | 251/29 |
| 2,972,337 | 2/1961 | Coggeshall et al. | 91/461 X |
| 3,353,453 | 11/1967 | Ramspeck | 91/461 X |
| 3,684,236 | 8/1972 | Lewis | 251/28 |

*Primary Examiner*—Arnold Rosenthal
*Attorney, Agent, or Firm*—Holman & Stern

[57] ABSTRACT

The invention relates to drain devices in hydraulic control circuits, particularly for hydraulic ultrarapid release control of a circuit breaker. In order to enable rapid decompression and draining of high pressure fluid in an hydraulic jack which controls the circuit breaker, a plurality of drain valves are mounted directly on the jack in a cascade arrangement. The valves are hydraulically controlled by oil pressure on pilot jacks and are of progressively increasing cross-sectional areas. All the valves in cascade are physically coupled to one another and the setting to drain of the valve with the smallest cross-section is controlled by an electrovalve.

14 Claims, 4 Drawing Figures

DRAIN DEVICES IN HYDRAULIC CONTROL CIRCUITS

FIELD OF THE INVENTION.

This invention relates to an hydraulic drain device for decompressing and draining high pressure hydraulic fluid in a vessel. In particular, the device is adapted to be controlled hydraulically in response to a low-output hydraulic drain signal, and it must be able to respond in a very short time (for example, a fraction of a millisecond), this time being calculated between the appearance of the hydraulic control signal and the decompression of the highpressure vessel. In addition, once the draining operation has begun, it must continue until complete drainage of the vessel has been achieved, at a high output, in order to drain the whole of said vessel (for example in a time of the order of 1 millisecond for a volume of 1000cm$^3$ of oil). Such a device may thus be referred to by the term "high-output, rapid-response drain device."

Drain devices of this type may be applied to numerous types of apparatus which are controlled hydraulically, where it is desirable to be able to carry out a manoeuvre rapidly by draining an hydraulic actuator, for example by draining a jack actuating a mechanical element.

BACKGROUND OF THE INVENTION.

Rapid movement is a necessity, particularly in the case of the hydraulic controls of high-power circuit-breakers, where the release of the circuit-breaker must be effected very rapidly after the occurrence of a fault, for example, a short-circuit.

Until the present time, with circuit-breakers for power transmission lines, an acceptable initiation period was of the order of 10 milliseconds (a half-cycle in AC at 50 cycles), but it would be desirable, because of the increase in interconnected power and with the purpose of limiting peaks, to achieve reduced shut-off times, preferably of less than 5 ms (a quarter-cycle), and of about 2.5 ms, for example, after the occurrence of a fault.

In various types of hydraulic control for circuit-breakers, the circuit-breaker is kept engaged by oil pressure against elastic release means which are always available (such as mechanical springs, pneumatic springs, hydropneumatic pressure, hydraulic compression, or the like). In order to release the device, in response to a release signal, it is enough for the hydraulic jack keeping the circuit-breaker engaged to be turned to drain. The initial release signal is most frequently an electrical signal controlling a draining electrovalve.

The occurrence of a fault on an electrical power line is detected by the safety devices. Electronic safety devices have very short intrinsic operating times which are measured in microseconds. In order to avoid undesirable release of circuit-breakers, and in particular in order to filter out transient disturbances at high frequency, these safety devices must be given a "thinking time" or delay, which must be at a minimum of the order of 0.5 milliseconds. Therefore, after issue of the electrical release signal, there remains a delay of 2 milliseconds for bringing the contact of the circuit breaker into the cut-off position, if the purpose indicated above has been selected.

This delay may be divided into four portions:

a. emission of the hydraulic low-output drain signal;
b. hydraulic transmission of this order to a high-output valve;
c. decompression of the jack;
d. draining and lowering of the jack.

In order to obtain very brief response times of the electrovalve providing the hydraulic drain signal, the moving parts of this device must be of low inertia, and have a small path of travel; the device must therefore be of small dimensions, which leads to a low-output electrovalve. Until the present time, in hydraulic controls, particularly for circuit-breakers, this low-output drain electrovalve was used as a pilot valve for a valve with a greater output, which was controlled hydraulically, and which set the high-pressure vessel to drain.

It became apparent that, in existing hydraulic controls functioning at oil pressures of the order of 300 to 500 kg/cm$^2$, the problem of rapid draining of a high-pressure vessel resided not only in the high-output evacuation of a certain volume of oil, but firstly in the decompression time of this oil. In fact, at these pressures, and when time lapses of the order of milliseconds are envisaged, the compressibility of the oil is a disadvantageous delaying factor of some importance.

Thus, as will be seen in more detail below, the compressibility at 300 kg/cm$^2$ of the oil contained in a 1 liter jack represents a volume of 15 cm$^3$. This is to say that this volume of 15 cm$^3$ must first of all be evacuated, at the beginning of draining of the jack, before any mechanical action controlled by the jack may really commence. The previous evacuation of this 15 cm$^3$ by a duct with a diameter of 20 mm would already require a delay of about 0.5 milliseconds, which is of course increased by the existence of "dead spaces" in the hydraulic controls. It is evident that lost time of 0.5 milliseconds must be taken into consideration when an overall time lapse of about 2 milliseconds is being aimed at.

BRIEF SUMMARY OF THE INVENTION.

It is an object of the present invention to provide a drain device which enables a considerable reduction in lost time through hydraulic fluid decompression, and also enables a liquid in a high pressure vessel to be evacuated at high output from a low output drain signal.

According to the present invention there is provided an hydraulic drain device for decompression and draining of high-pressure fluid in a vessel in response to a low-output hydraulic drain signal, said device being adapted to be controlled hydraulically and comprising a plurality of drain valves disposed in cascade and being of successively increasing cross-section, each valve being coupled to its adjacent valve or valves without interposed ducting, and said drain valves being arranged for hydraulic control by individual pilot jacks, each of the latter communicating at one end directly with an orifice of, and being monitored by a drain flap of, the adjacent valve, the valve with the largest cross-section being connected to the vessel containing the high-pressure fluid which is to be decompressed and drained, and the pilot jack of the valve with the smallest cross-section being controlled by the hydraulic drain signal.

DESCRIPTION OF THE DRAWINGS.

Embodiment of the present invention will now be described by way of example with reference to the accompanying drawings, in which:-

FIG. 4 is a detail, in section and on a larger scale, of another part of the device of FIG. 2.

Figure 1:
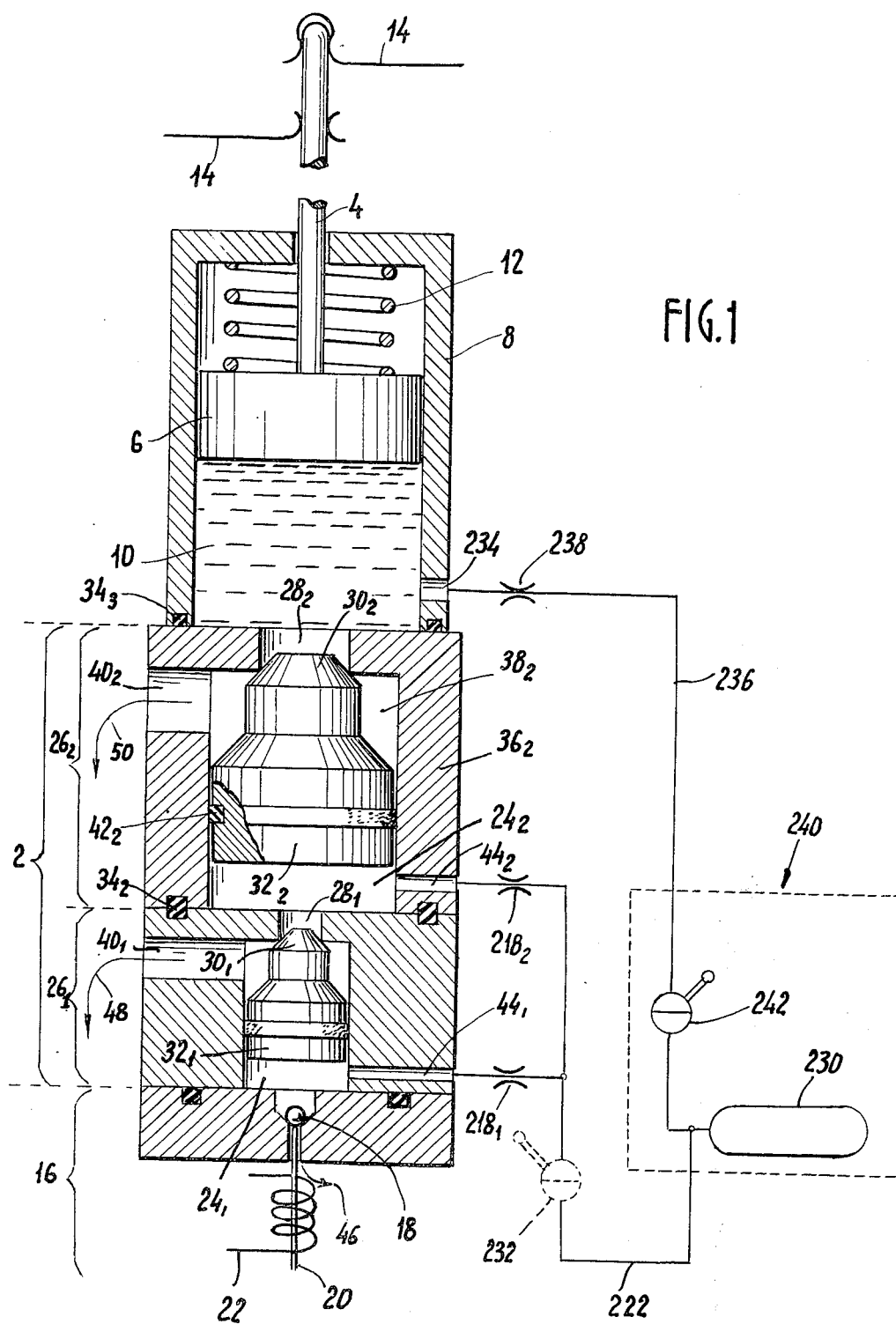
FIG. 1 is a simplified illustration of a drain device according to the invention, applied to an hydraulic circuit-breaker control, only two drain valves being shown, disposed in cascade.

Referring to the drawings, an hydraulic drain device 2, shown in FIG. 1, is applied, by way of example, to the release of an electrical circuit-breaker, whose movable contact 4 is actuated by a piston 6 of a jack 8, for example, an oil-filled jack. In the engaged position of the circuit-breaker shown in FIG. 1, the movable contact 4 is kept in a contact engaging position by the oil pressure in the chamber 10 of jack 8, acting against the force of a release spring 12.

In order to release the circuit-breaker, for example upon a fault occurring in line 14—14, monitored by the circuit-breaker, it is sufficient to set the high-pressure vessel constituted by chamber 10 to drain. This function is ensured by the drain device 2, in response to a low output hydraulic drain signal. This drain signal may be supplied by a draining electrovalve 16, whose flap 18, in the form of a ball, may be raised from its seat by a stem 20 actuated by an electromagnet 22. In response to energisation of the electromagnet, chamber $24_1$, monitored by the flap 18 is set to drain, at low output.

The drain device 2 comprises a plurality (two only in the simplified case of FIG. 1) of drain valves $26_1 - 26_2$. These valves have drain orifices $28_1 - 28_2$ of increasing cross-sections, which are normally closed by respective drain flaps $30_1 - 30_2$, said flaps being hydraulically controlled by the respective pistons $32_1 - 32_2$ of individual pilot jacks. The valves $26_1 - 26_2$ etc. are disposed in a cascade, and are physically coupled to one another. Thus the upper surface of the body of valve $26_1$ is directly assembled against the lower surface of the body of valve $26_2$, with an interposed seal joint $34_2$. For reasons of clarity in FIG. 1, the assembly means (screws, straps, tappings, or similar) connecting the valves together, have not been shown. According to this arrangement, no ducting is interposed between two successive valves, enabling the "dead spaces" between two valves to be reduced to a minimum. Thus the dead space comprised between two valves, for example valves $26_1$ and $26_2$, comprises only that volume defined by chamber $24_2$ and the internal volume of orifice $28_1$.

As is apparent, the pilot jack chamber (such as $24_2$) of any given valve commmunicates directly with the orifice (such as $28_1$) of the preceding valve, said orifice being monitored by the drain flap (such as $30_1$) of this preceding valve.

The pilot jack chamber $24_1$ of the first valve $26_1$ (the valve with the smallest cross-section) is, in the same way, directly connected to the electrovalve 16 which provides the low-output hydraulic drain signal controlling the positioning to drain of the overall draining device according to the invention.

According to a preferred embodiment, the last valve (such as $26_2$), with the largest cross-section, is in the same way directly connected to the high-pressure vessel to be decompressed and drained, without any interposed ducting, i.e. the upper surface of valve $26_2$ is physically coupled, with an interposed gasket $34_3$, to the base of the jack 8.

All the drain valves $26_1 - 26_2$ etc. are of identical construction, and differ only in their dimensions, which are such that the cross-sections of the drain orifices increase according to a progression which will be detailed in the following description.

Only one valve will be described, for example the one carrying the reference numeral $26_2$. This valve comprises a valve body $36_2$, in which there is defined an internal chamber $38_2$ which may communicate selectively with the adjacent high-pressure vessel 10 via the orifice $28_2$, the latter being normally closed by the flap $30_2$. The chamber $38_2$ also permanently communicates with a lowpressure vessel (generally a reservoir or tank at atmospheric pressure) through one or more orifices $40_2$. Thus it is clearly apparent that the flap $30_2$ is lodged in the portion of the valve under low pressure. The piston $32_2$, integral with flap $30_2$, can slide in the chamber of the valve body, a seal gasket $42_2$ being provided on this piston.

Each flap, such as $30_2$, is normally kept applied against its seat, against the high pressure obtaining above the flap, and thus tending to open it, by means of the high pressure obtaining in the chamber, such as chamber $24_2$, of the pilot jack associated with this flap. The two aforementioned high pressures being preferably identical, as will be hereinafter apparent, each flap may be normally kept closed by the fact that the surface of the piston such as $32_2$ is greater (for example 25 to 30% greater, in order to ensure closing of the flap) than the surface area of the flap exposed to the high pressure, i.e. the cross-section of orifice $28_2$ forming the seat of the flap.

Finally, each drain valve body, such as $36_2$, has passing therethrough an orifice, such as $44_2$, opening into the chamber, such as $24_2$, of the pilot jack, and intended, as will be seen later, to supply oil under high pressure to all the pilot jacks.

There will now be described the method of operation of the drain device according to the invention which is applied to hydraulic control of a circuit breaker, proceeding from the condition shown in FIG. 1 wherein the circuit-breaker is kept in the engaged position.

In this position, the chamber 10 of jack 8 is filled with oil under pressure, for example at 300 kg/cm², which keeps the piston 6 in an upper position, against the pressure of the release spring 12. Likewise, the chambers $24_1 - 24_2$ of the pilot jacks are filled with oil at the same pressure, which keeps the flaps $30_1 - 30_2$ held against their seats, and also the ball flap 18 of the electrovalve 16 on its seat. It will be presumed, in this part of the description, that the re-supply orifices $44_1 - 44_2$ are closed.

The compressibility of oil in volume (about $5 \times 10^{-5}$ per kg/cm² of increase in pressure) represents, at 300 kg/cm², a reduction in volume of about 15 cm³ per liter. If it is presumed, by way of example, that the volume V of the chamber 10 and of the very small dead space constituted by the orifice $28_2$ is 1 liter, it will then be necessary, on opening of drain flap $30_2$, to evacuate first of all 15 cm³ of oil in order to "decompress" or "expand" this volume of oil before draining becomes effective, i.e. before piston 6 begins to move. Therefore there will be a certain delay due to decompression, this delay being detailed in the following. Likewise, the volumes of oil (infinitely more reduced, thanks to the diminution in dead spaces indicated above) contained in the chambers $24_1$ and $24_2$ will also involve decompression delays.

Thus, if an electrical release command energises electrovalve 16, the flap 18 of this valve rises, requiring a time $t_1$. In a second time delay $t_2$, the oil contained in chamber $24_1$ is decompressed, i.e. a small quantity of oil is evacuated to drain (see arrow 46), without the piston-flap assembly $32_1 - 30_1$ moving. At the end of period $t_2$, the oil being decompressed, the flap $30_1$, pushed back by the pressure obtaining in chamber $24_2$, begins to open and drainage of chamber $24_1$ takes place during a period $t_3$ during which flap $30_1$ completes its entire lifting movement.

From the beginning of opening of flap $30_1$ (i.e. shortly after the end of period $t_2$), the oil contained in the pilot jack chamber $24_2$ can decompress, i.e. a small volume of oil (corresponding to the compressibility of the oil in the volume $24_2$) is evacuated to drain by the orifices $28_1$ and $40_1$ (see arrow 48). This depression requires a period $t_4$, during which the second flap $30_2$ still remains applied against its seat. Complete drainage of jack chamber $24_2$ takes place during a period $t_5$, during which flap $30_2$ finishes carrying out its entire lifting movement. Finally, from the beginning of opening of flap $30_2$ (i.e. shortly after the end of period $t_4$), the oil contained in the jack 8 can begin to decompress, i.e. the volume of oil corresponding to the compressibility in the volume 10 is evacuated to drain through the orifices $28_2$ and $40_2$ (see arrow 50). This decompression requires a time period $t_6$ (which will be detailed later), and effective drainage of jack 8 only begins at the end of this period $t_6$, i.e. piston 6 begins to move in order to begin the movement of the mechanical element (the movable contact 4) which was to be activated in the first place.

It should be noted that the total response delay of the drain device (from energisation of the electrovalve until the setting in motion of the mechanical unit to be controlled) is in no way the sum of periods $t_1+t_2+t_3+t_4+t_5+t_6$ . . . as defined above, as there is an "overlap" of the various operating phases. Naturally, the last decompression delay ($t_6$ in the example) is the longest, since the volume to be decompressed (volume of chamber 10) is infinitely greater than those of the pilot jack chambers ($24_1$–$24_2$, etc.) to be decompressed.

Therefore there will be examined, by way of illustration, the features to be given to the valve of the largest cross-section, so that the decompression of volume 10, presumed to be 1 liter (1000 cm³) does not require a period $t_6$ greater than 0.1 of a millisecond. It has been seen that, at a pressure of 300 kg/cm², the volume Q to be evacuated in order to decompress the oil is 15 cm³. An average oil evacuation speed of V = 100 m/seconds may be accepted, or $10^4$ cm/s, which gives, if S is the area in square centimetres, of the orifice $28_2$, (active area of flap $30_2$):

$$Q = V \times S \times t_5 \text{ or:}$$

$$S = \frac{Q^2}{V \times t_5} = \frac{15}{10^4 \times 10^{-4}} = 15 \text{ cm}^2$$

If it is presumed that the jack chamber 10, having a capacity of 1 liter, has a cross-section of 50 cm² and a path of travel of 20 cm, it is thus seen that the cross-section of the drain orifice $28_2$ must be about one third of the cross-section of the jack, which is a considerable proportion, and clearly shows the importance of mounting the last drain valve ($26_2$) directly on the base of the jack, in order to avoid any ducting of great length and large cross-section, which would inadmissibly increase the dead spaces. It should be noted that the total response time of the device according to the invention is not only reduced by means of the "overlap" or "pairing" of the various operating phases, but also thanks to the hydrodynamic effect exerted on the flaps as soon as they begin to open.

In effect, as the flaps, such as $30_1 - 30_2$, are mounted in the low pressure portions of the valves, the current of draining fluid tends to accelerate the movement of each flap as soon as the latter has begun to open, contrary to what happens with drain valves having their flaps located in the high-pressure portions of the valves. This favourable hydrodynamic accelerating effect may also be increased by appropriate shaping of the portion of the flaps exposed to the flow of draining fluid, as already described in my copending French Patent Application No. 74 06811.

In the simplified example shown in FIG. 1 (with only two drain stages after the electrovalve), it may be presumed that the drain cross-sections increase according to a geometric progression with a factor of 30, which would give the following cross-sections, from orifice $28_2$ whose cross-section (15 cm²) has been defined previously:

Orifice $28_1 = (15/30) = 0.5$ cm² ;
cross-section of drain passage of the electrovalve:
$16 = (0.5 \text{ cm}^2/30) = 1.7 \text{ mm}^2$.

It is of interest to choose an electrovalve having a drain cross-section of the order of magnitude indicated above, as such electrovalves may be produced with ultrarapid response time (for example lower than a millisecond, and for example about 0.5 ms) after the appearance of the electrical signal energising the electrovalve. Such an "ultra-rapid" drain electrovalve has been described in the abovementioned Patent Application.

It should also be noted that the progression indicated above is only given by way of illustration, as in practice, as will be seen later with reference to FIGS. 2 and 3, it is more advantageous to choose a lesser geometric progression, for example of the order of about 3 (for the passage cross-sections) in order to harmonise the speeds of the mechanical elements in motion, and the oil speeds.

In the above estimate, and with reference to FIG. 1, a starting point has been chosen in which the dead time $t_6$ for decompression of the volume 10 was 0.1 milliseconds. By conserving the progression of a factor of 30 and accepting, as indicated above, that the pistons $32_2 - 32_1$ have cross-sections 25 to 30% greater than those of the corresponding orifices ($28_2 - 28_1$), the volumes of oil contained in the chambers $24_2 - 24_1$ may be deduced therefrom (about 21 cm³ and 0.13 cm³).

For a pressure of 300 kg/cm², these volumes respectively require the following decompression dead times:

$t_4 = 0.06$ ms
and
$t_2 = 0.01$ ms.

The total dead decompression time of the device shown in FIG. 1 is therefore:

$t_2 = t_4 + t_6 = 0.1 + 0.06 + 0.01 = 0.17$ ms.

When decompression has been effected, the flap-piston assemblies (such as $30_2 - 32_2$) are pushed downwards by the high pressure exerted on the top of the flap and by the hydrodynamic effect described above, with a very high acceleration which can reach about 2000 g. Under these conditions, the lifting time (complete opening) of the flap is: $t_5 =$ about 1 ms for the flap $30_2$ (whose lift is about 1.1cm): $t_3 =$ about 0.3 ms for the flap $30_1$ (whose lift is about 0.2 cm).

Therefore the total theoretical response time is:

$t_2 + t_3 + t_4 + t_5 + t_6 = 1.74$ ms

, but it may be calculated that the "overlap" of the openings of the valves reduces the delay by about 0.2 ms, which leads to a real response time:

$T =$ about 1.3 ms.

If, in order to control the drain device according to the invention, an ultra-rapid electrovalve is used of the type mentioned above, whose response time is of the order of 0.6 ms, it is seen that the total respone time of the assembly of the drain system (from the appearance of the electrical control signal, until effective setting in motion of the mechanical element to be actuated, i.e. the movable contact of the circuit-breaker in the example chosen) may be:

$0.6 + 1.3 = 1.9$ ms, roughly.

The opening delay of the movable contact, once it is set in motion, relative to the fixed contact, depends of course on the opening distance of the contacts, presuming an identical acceleration (for example 2000 g) of the movable equipment. Thus, for a travel of 10 cm, the opening delay would be about 3 ms, leading to a total delay of 4.9 ms (less than a quarter-cycle) including the response time indicated above.

In order to obtain even shorter opening times, it is of course necessary to reduce the travel of the movable contact necessary to bring it into the cut-off position, a complementary travel being necessary in order to ensure permanent dielectric insulation. In this case particular dielectric fluids may be used, for example dielectric gases in a liquified state, such as SF6. Such circuit-breakers, using a liquified dielectric gas, have been described in my Franch Pat. No. 71-35 197. If the operational travel of the movable contact is reduced to 11 mm, the time of movement of the movable contact is around 1 ms, giving a total time (including the response time of the drain device) of : $1.9 + 1 = 2.9$ ms, representing 60% only of a quarter-cycle.

To the present, the functioning of the device according to the invention has been examined at a time when it passes from the inoperative position (shown in FIG. 1) into the drain position. There will now be a brief examination of the return into the inoperative position, i.e. in the case where the device is associated with an hydraulic circuit-breaker control, the return into the engaged position of the circuit-breaker.

As has been indicated, ducts $44_1 - 44_2$ are provided in order to re-supply respectively the chambers $24_1 - 24_2$ of the pilot jacks. These ducts are preferably provided with flow limiters $218_1 - 218_{-2}$, and are connected by a tube 222 to a high-pressure oil source, such as an oleopneumatic accumulator 230. In the tube 222 there may be incorporated (without this being necessary, as will be seen later) a butterfly 232.

The main jack 8 likewise comprises a re-supply orifice 234 which is connected by a duct 236, in which there may be incorporated a flow limiter 238, to a control block or box 240, of a known type, which has been simply shown diagrammatically by an engagement valve 242 enabling the jack 8 to be connected to the accumulator 230.

In order to engage the circuit-breaker, it is sufficient temporarily to open butterfly 232 in order to fill with oil under pressure the chambers $24_1 - 24_2$ of the pilot jacks, so as to close again the drain flaps $30_1 - 30_2$. Butterfly 232 is then opened, and the jack 6 is pushed by the oil under pressure, against the force of spring 12, bringing the movable contact 4 back against the fixed contact. In practice, it is unnecessary to provide butterfly 232 in duct 222, if the calibre of the throttles $218_1 - 218_2$, for example 0.3 mm jets, is suitably chosen.

Under these conditions, the chambers of the pilot jacks of the drain valves are permanently connected to the high-pressure oil source, without inconvenience, since the cross-section of the re-supplying jets is very small compared to the cross-section of the drain orifices of the valves. Because of this arrangement, the drain flaps close again successively and automatically as soon as the drain signal has disappeared. This feature is very advantageous in the case of circuit-breaker controls, as it enables the manoeuvres OPEN - CLOSED in succession to be very rapidly carried out, as is often required for these devices.

Figure 2:
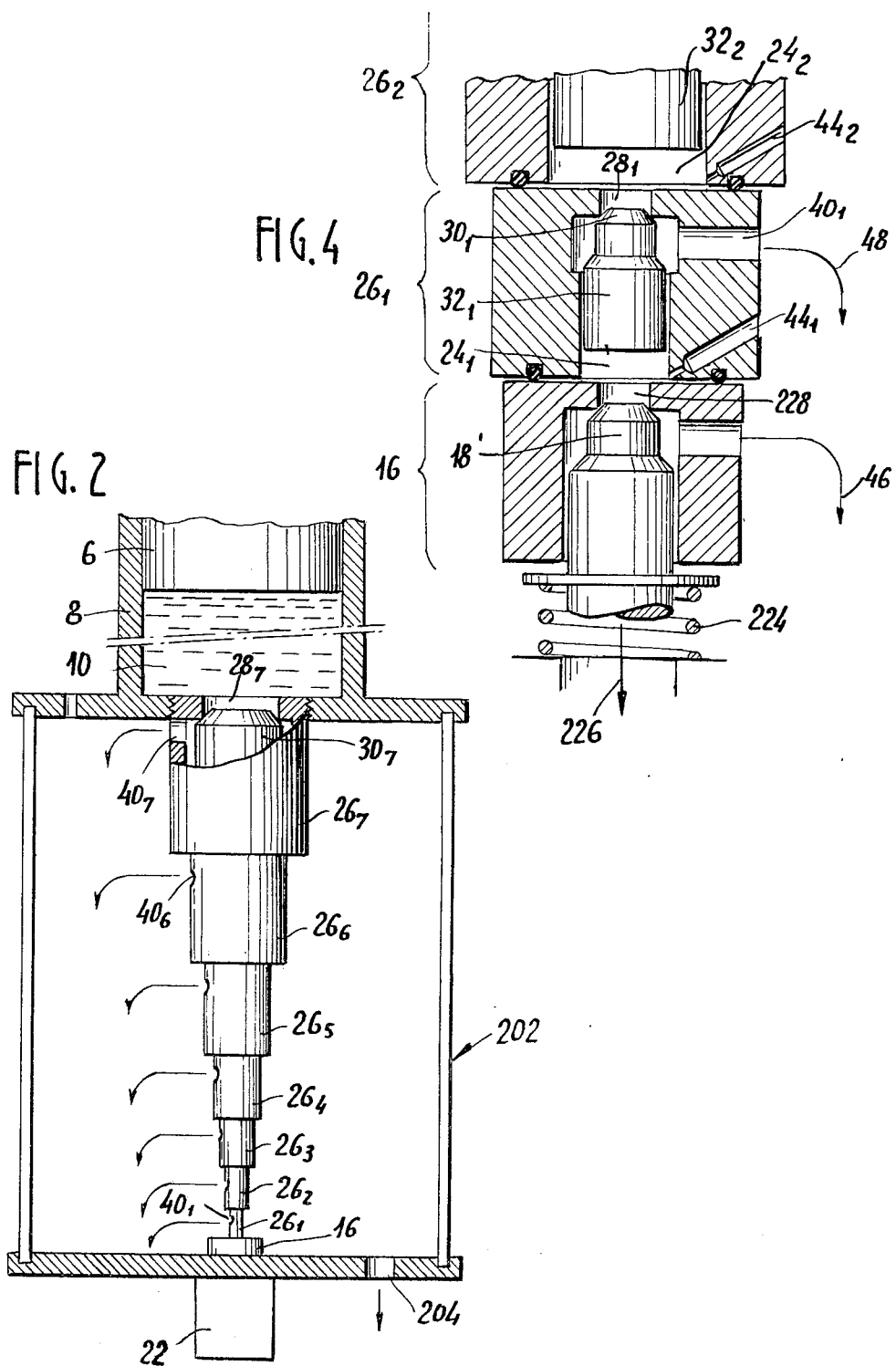
FIG. 2 is a schematic view, in partial section, of a preferred embodiment of the invention, the device comprising seven drain valves in cascade.

FIG. 2 shows an elevation, in partial section, of a drain device according to the invention, adapted to control the drain of the hydraulic jack 8 in a hydraulic circuit-breaker control.

In this example, the device comprises seven drain valves $26_1 - 26_2 \ldots 26_6 - 26_7$, in cascade, the cross-sections of whose drain orifices increase, for example, substantially according to a geometric progression whose factor may be of the order of 3 in the example shown.

Figure 3:
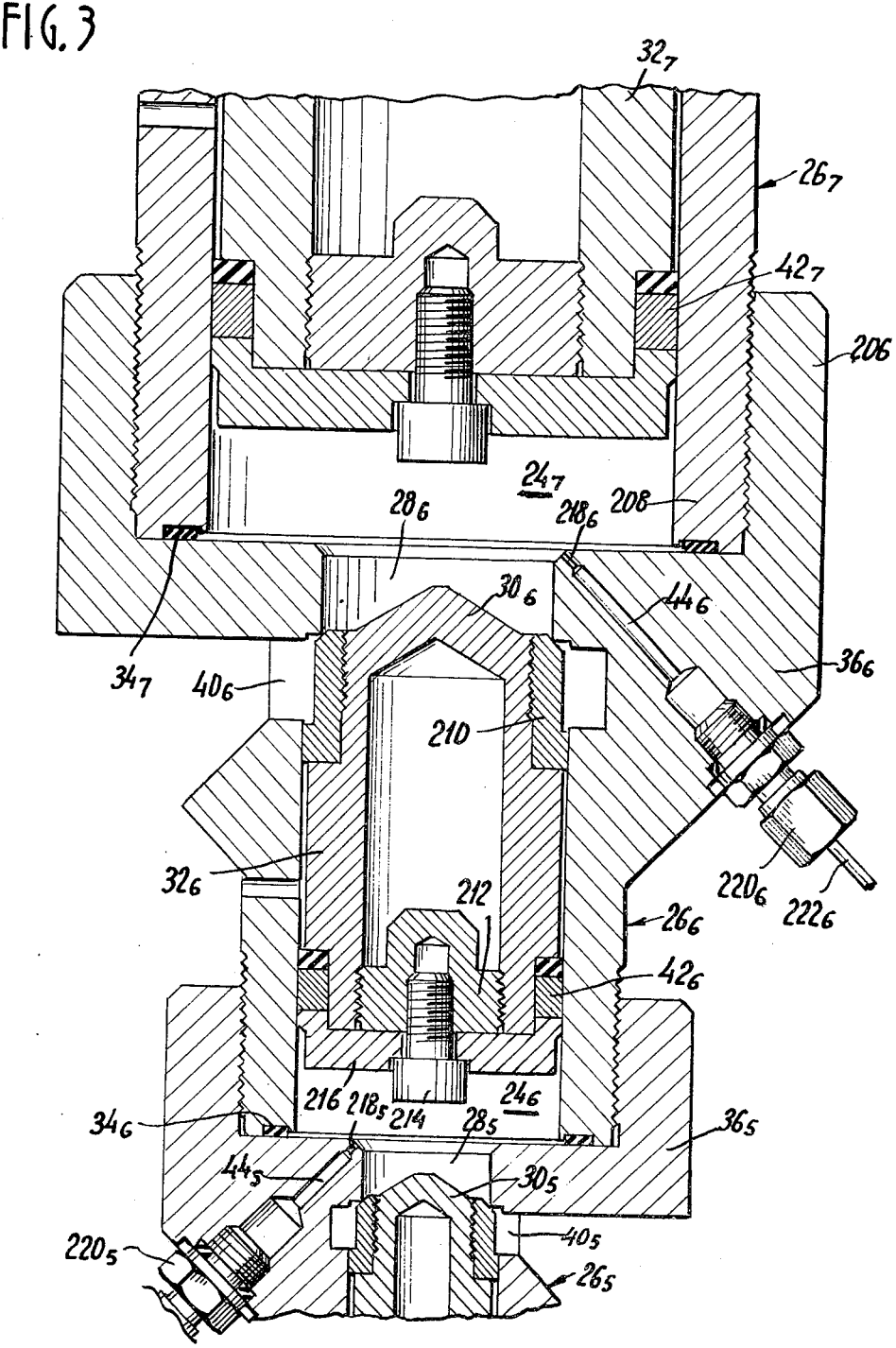
FIG. 3 is a detail, in section, of a part of the device of FIG. 2.

FIG. 3 shows in detail and in cross-section the portion of the device comprising the valves $26_5 - 26_6 - 26_7$. According to this example, the cross-section of the orifice $28_6$ is about 3 times greater than that of orifice $28_5$, the cross-section of orifice $28_7$ (FIG. 2) is about three times greater than that of orifice $28_6$, and so on. The valve with the largest cross-section $26_7$ is directly assembled on the base of jack 8 whereas the valve with the smallest cross-section, $26_1$, is directly assembled on the drain control electrovalve 16.

For preference, the electrovalve 16 and its electromagnetic actuator 22, are of the ultra-rapid type described in the abovementioned Patent Application, whose response time can be about 0.6 ms for a drain cross-section of about 1.5 mm². With the number of valves in cascade, and with the progression of the cross-sections indicated above, the drain cross-section of the orifice $28_7$ of the last valve can be of the order of 35 cm², which represents an enormous cross-section enabling extremely rapid decompression and draining of jack 8.

In effect, if it is considered that the jack 8 to be drained is a 1-liter jack, having a cross-section of 100 cm² and a travel of 10 cm, the cross-section of the drain orifice $28_7$ represents about one-third of the cross-section of the jack.

In order to further accelerate the drain, without introducing any loss of charge in the drain ducts, the stacking of all these valves, is preferably mounted in a reservoir 202 at atmospheric pressure, into which reservoir the orifices $40_1, 40_2 \ldots 40_6, 40_7$ of the individual valves open directly. The reservoir 202 is emptied through a lower orifice 204 and, preferably, this reservoir is kept empty at normal times in order that no counter-pressure due to the level of oil can act as a brake on the drain of the valves, when the circuit-breaker is released.

FIG. 3 shows a particular type of assembly for stacking of the valves, and a lighter type of construction, for the valves of larger cross-section. The body, such as $36_6$, of each valve, such as $26_6$, is extended upwards by a tapped collar 206, into which is screwed the lower threaded portion 208 of the body of the valve $26_7$ immediately above, with an interposed seal gasket $34_7$.

In order to reduce as far as possible the response time of the overall device, the opening time of each flap should be as short as possible, i.e. each flap must be exposed to a very high acceleration at the moment of opening, under the effect of the pressure differential obtaining above the flap and below its control piston. Therefore, in order to increase these accelerations, it is appropriate to lighten the moving parts (flap-piston), particularly the flap-pistons of the last valves (for example the three last) which are relatively bulky.

Thus, the flap-piston $30_6 - 32_6$ is preferably made up of a hollow piece of lightweight alloy on the upper part of which there is mounted a hard metal ring 210 bearing on the lower edge of the orifice $28_6$ forming the seat for flap $30_6$. The lower end of the hollow part mentioned is closed by a screwed plug 212 into which there is turned a screw 214 which retains a base 216 in the form of a basin, retaining and compressing the packing $42_6$ of the piston of the flap. It will be remembered at this point that the cross-section of the piston is about 25 to 30% greater than that of the flap (cross-section of orifice $28_6$) in order to ensure reliable closure of the flap on its seat.

In the simplified case in FIG. 1, (progression at a factor of 30 for the cross-section of the successive valves) the cross-section of a pilot piston (such as $32_2$) is about 38 times greater than the cross-section of the drain orifice (such as $28_1$) corresponding therewith. Thus the speed of the oil in this orifice is 38 times greater than the speed of the corresponding piston, which may lead to excessive oil speeds braking the end of travel of the piston of the pilot jack. This is why it is more advantageous to provide a more moderate progression of the increasing cross-sections of the drain valves than has been shown with reference to FIG. 2. In effect, in this case, for example with drain cross-sections increasing in accordance with a geometric progression with a factor of 3, the cross-section of a pilot jack is about 3.8 times greater approximately than the cross-section of the corresponding drain orifice, leading only to an oil speed about 4 times greater than the speed of the piston. Thanks to this arrangement, and in spite of the increase in the number of valves in cascades (for example 8 instead of 3), an even shorter response time is achieved, the "overlap" of the individual drain times of the pilot jacks contributing to obtaining this short response time. FIG. 3 likewise shows ducts such as $44_4 - 44_6$, which respectively pass through the valve bodies $36_5 - 36_6$ and open into chambers $24_6 - 24_7$, to re-supply high pressure oil to the pilot jacks of the corresponding flaps. In these ducts, there are provided throttles or jets such as $218_6 - 218_7$, as discussed above. (These jets may for example have a diameter of around 0.3 mm). The ducts $44_5 - 44_6$ are joined by connections $220_6 - 220_7$ to tubelets such as $222_6$ which then pass out of the reservoir 202, and connect to the high-pressure oil source.

FIG. 4 shows, in section and on a larger scale, another portion of the assembly of valves in a device according to the invention, and, more specifically, the portion enclosing the valves with the smallest cross-sections, i.e. the valves such as $26_1 - 26_2$ etc.

It has in fact been indicated that the successive valves have increasing cross-sections, for example according to a geometric progression with factor R. Consequently, it appears logical, if electrovalve 16 supplying hydraulic signals controlling the entire device has a drain cross-section $s$, to give the flap $30_1$ of the first valve $26_1$ (i.e. to orifice $28_1$) a section $s_1 = R \times s$, then to the orifice $28_2$ of the second valve a cross-section $s_2 = R^2 \times s$, and so forth. This is the solution which has been illustrated and described with respect to FIG. 1.

In practice, it may be more advantageous, in order to reduce the delay time of the drain system assembly (electrovalve plus cascade of drain valves), to provide, for the first valve $26_1$, only a cross-section for fluid admission substantially equal to the drain cross-section of the electrovalve. In effect, the response time of an electrovalve is relatively long, through the fact of mechanical and electrical inertia of this apparatus, despite its small dimensions, and despite the improvements made therein. On the contrary, the response time of a drain valve which is hydraulically controlled by a pilot jack is much less since, it is practically reduced to the decompression time of the volume of oil in the pilot jack.

This solution is illustrated in FIG. 4, where only the upper portion of the electrovalve 16, all of the first drain valve $26_1$, and the lower portion of the second valve $26_2$ have been shown.

In this preferred variant, the electrovalve 16 is of the "ultra-rapid" type, described in the abovementioned Patent Application, i.e. the flap 18' is lodged in the low-pressure portion of the valve 16 (and not in the high-pressure portion, like the ball 18 in FIG. 1), the flap being normally kept pressed against its seat by spring 224. In addition, the flap 18' is tractively actuated, in the direction of arrow 226, for opening of said flap, by a rapid electromagnetic actuator (not shown). The cross-section for passage of the fluid drained through this valve i.e. the cross-section of orifice 228, is $s$, which is for example about 1.5 mm$^2$.

The first drain valve $26_1$, which is thus the first valve controlled hydraulically (and not electromagnetically), is mounted directly on electrovalve 16. The cross-section of the flap of this valve (i.e. the cross-section of orifice $28_1$) is substantially equal to $s$ (and not $s$ multiplied by the factor of the selected geometric progression). The surface area of piston $32_1$, integral with the flap, is thus only about 1.3 times $s$, so that the emptying orifice 228 of chamber $24_1$ of the pilot jack represents about 75% of the cross-section of this jack, enabling ultra-rapid decompression of chamber $24_1$, particularly if it is considered that the volume of this chamber (including the dead space of orifice 228) is of the order of 4 to 6 mm$^3$. At a pressure of 300 kg/cm$^2$, the volume of oil to be evacuated from this chamber in order to decompress it, is of the order of 0.1 mm$^3$, a volume which can be evacuated as soon as the flap 18' begins to open, and without waiting until it has lifted completely. Given that the flap $30_1$ is extremely light, it may adopt an acceleration well above that of the movable assembly of the electrovalve, so that the drain flap $30_1$ is completely open before the flap $18'$ of the electrovalve has finished its lifting movement. Again, use is made of the "overlap" of the operative phases, which permits avoidance of addition of the individual operating times of each valve.

Tests have shown that an overall time of less than 2 ms can be obtained, this time being counted from the beginning of emission of the electrical release signal, until the movable contact of the circuit-breaker has covered a path of 11 mm. This time breaks down into: 0.5 ms for the electrovalve; 0.5 ms for the cascade drain device; 1 ms for the operational path of the jack actuating the movable contact.

The drain device, in combination with a circuit-breaker operating with liquified SF6 of the type described in the abovementioned French Patent, No. 71-35 197, enables the transfer of current to a resistor within the time indicated above.

Having set forth the nature of this invention, what is claimed herein is:

1. A valve device for draining high pressure liquid from an enclosure, comprising a body defining at least two aligned cylinders of successively increasing internal diameter, a piston slidably disposed in each cylinder and dividing the same into a discharge chamber and a pressure chamber, each discharge chamber having an outlet port and an inlet port forming a valve seat, a valve element carried by each piston for closing against said valve seat, the inlet port of the largest diameter discharge chamber communicating with said enclosure and the inlet port of any smaller diameter discharge chamber communicating with the pressure chamber of the adjacent larger cylinder, means for supplying liquid under pressure to all the pressure chambers whereby to move each valve element through the related piston towards its valve seat and maintain it in the seated position, and means for discharging the pressure liquid from the smallest diameter pressure chamber in response to a drain signal.

2. A device according to claim 1, wherein said inlet port of said largest diameter discharge chamber is physically coupled, without any interposed ducting, to the high pressure liquid containing enclosure to be drained.

3. A device according to claim 1, wherein the drain signal is provided by an electrovalve, which is physically coupled to the pressure chamber having the smallest diameter.

4. A device according to claim 3, wherein the electrovalve is an ultra-rapid electrovalve.

5. A device according to claim 3, wherein the drain valve element with the smallest diameter has a diameter substantially equal to the valve seat diameter of the said electrovalve.

6. A device according to claim 1, wherein the cross-section of the piston carrying each valve element is approximately 25 to 30% greater than the cross-section of the valve seat which is normally closed by said valve element.

7. A device according to claim 1, wherein said cylinders are mounted one above the other in a stacked fashion, and there is provided a low-pressure reservoir in the interior of which the stack thus constituted is mounted, the reservoir being arranged for receiving the drain liquid, said outlet ports of the discharge chambers opening directly into said reservoir, without any interposed ducting.

8. A device according to claim 7, wherein the body of each cylinder is screwed directly into the body of the adjacent cylinder, in order to form said stack, and a seal gasket is interposed between connected cylinder bodies.

9. A device according to claim 1, wherein the cross-sections of the successive discharge chamber inlet ports increase in size substantially in accordance with a geometric progression.

10. A device according to claim 1, wherein at least certain of the valve element piston assemblies are hollow and formed, at least in part, of lightweight alloy.

11. A device according to claim 1, wherein said means for supplying liquid to said pressure chamber comprises a duct which passes through the body of each cylinder and opens into said pressure chamber thereof, said ducts being connectible to a source of high-pressure fluid for re-supplying said pressure chambers of the cylinders.

12. A device according to claim 11, wherein a flow limiter is provided in the connection between each of said ducts and the high-pressure source.

13. A device according to claim 1, wherein the high-pressure liquid containing enclosure to be drained is an hydraulic jack for actuating the movable contact of a circuit breaker.

14. An hydraulic control system, particularly for a circuit-breaker, including a drain device according to claim 1, and an hydraulic control circuit therefor.

* * * * *